(12) United States Patent
Harper

(10) Patent No.: US 10,054,204 B2
(45) Date of Patent: Aug. 21, 2018

(54) VARIABLE OUTPUT PLANETARY GEAR SET WITH ELECTROMAGNETIC BRAKING

(71) Applicant: Richard Harper, New Braunfels, TX (US)

(72) Inventor: Richard Harper, New Braunfels, TX (US)

( * ) Notice: Subject to any disclaimer, the term of this patent is extended or adjusted under 35 U.S.C. 154(b) by 116 days.

(21) Appl. No.: 15/401,321

(22) Filed: Jan. 9, 2017

(65) Prior Publication Data

US 2018/0195593 A1    Jul. 12, 2018

(51) Int. Cl.
*F16H 37/04* (2006.01)
*F16H 3/54* (2006.01)
*F03D 15/00* (2016.01)

(52) U.S. Cl.
CPC ............. *F16H 37/04* (2013.01); *F16H 3/54* (2013.01); *F03D 15/00* (2016.05); *F05B 2260/40311* (2013.01); *F16H 2037/048* (2013.01); *F16H 2200/2005* (2013.01); *F16H 2200/2033* (2013.01)

(58) Field of Classification Search
CPC .... F16H 37/04; F16H 3/54; F16H 2200/2033; F16H 2200/2005; F03D 15/00; F05B 2260/4031
See application file for complete search history.

(56) References Cited

U.S. PATENT DOCUMENTS

| | | | |
|---|---|---|---|
| 3,815,445 A | 6/1974 | Gorrell et al. | |
| 4,697,477 A | 10/1987 | Barr | |
| 7,059,453 B2 | 6/2006 | Yamamoto et al. | |
| 7,300,376 B2 | 11/2007 | Eckert et al. | |
| 7,534,188 B2 | 5/2009 | Pritchard et al. | |
| 7,540,818 B2 | 6/2009 | Miller et al. | |
| 8,133,143 B2 | 3/2012 | Schoon | |
| 8,869,952 B2 | 10/2014 | Sano | |
| 8,961,350 B1 | 2/2015 | Millet et al. | |
| 2004/0180747 A1 | 9/2004 | Weiland et al. | |
| 2012/0014797 A1* | 1/2012 | Hehenberger | H02K 7/116 416/170 R |
| 2012/0014798 A1* | 1/2012 | Hehenberger | H02K 7/116 416/170 R |
| 2012/0063902 A1* | 3/2012 | Heenberger | F16H 3/724 416/170 R |
| 2012/0234179 A1* | 9/2012 | Miki | F24F 1/0007 96/397 |
| 2014/0038761 A1 | 2/2014 | Xu | |

(Continued)

*Primary Examiner* — David J Hlavka
(74) *Attorney, Agent, or Firm* — Egbert Law Offices, PLLC

(57) ABSTRACT

A variable output planetary gear set includes an input shaft, and input gear affixed to the input shaft so as to rotate with a rotation of the input shaft, a brake rotor, a rotor input gear affixed to the brake rotor, a planetary gear set, an output shaft cooperative with the planetary gear set, and an electromechanical brake cooperative with the brake rotor so as to selectively apply a braking force so as to slow a rotation of the rotor input gear. The electromechanical brake is, in particular, an eddy current brake. The planetary gear set includes a planetary input gear, a planetary carrier, plurality of planetary gears, a sun gear and a ring gear. The input gear is engaged with the planetary input gear. The ring gear is engaged with the rotor input gear.

19 Claims, 5 Drawing Sheets

(56) References Cited

U.S. PATENT DOCUMENTS

2016/0032899 A1\* 2/2016 Fujiwara ................. F03D 11/02
  416/169 R
2016/0076630 A1\* 3/2016 Hehenberger ........ F03D 7/0276
  475/5

\* cited by examiner

VARIABLE OUTPUT PLANETARY GEAR SET WITH ELECTROMAGNETIC BRAKING

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to planetary gear sets and systems. More particularly, the present invention relates to planetary gear sets that utilizes eddy current electromagnetic brakes to influence the operational characteristics of the planetary gear set. The present invention also relates to transmissions which include planetary gear sets.

2. Description of Related Art Including Information Disclosed Under 37 CFR 1.97 and 37 CFR 1.98

Planetary gearing is a gear system having one or more outer gears or planet gears revolving around a naseral or sun gear. Typically, planetary gears are mounted to a movable arm or carrier which itself may rotate relative to the sun gear. Planetary gearing systems also incorporate the use of an outer ring gear or annulus which meshes with the planet gears. Planetary gears are typically classified as simple or compound planetary gears. Simple planetary gears have one sun, one ring, one carrier, and one planet set. Compound planetary gears involve one or more of the following three types of structures: meshed-planets (there at least two more planets in meshed with each other in each planet train), stepped-planet (there exist a shaft connection between two planets in each planet train), and multi-staged structures (the system contains two or more planets sets). The axes of all gears are usually parallel. The sun, the planet carrier and the ring axes are usually coaxial.

An eddy current brake is a device used to slow or stop a moving object by dissipating its kinetic energy as heat. The drag force in the eddy current brake is an electromagnetic force between a magnet and a nearby conductive object in relative motion due to eddy currents induced in the conductor through electromagnetic induction. A conductive surface that moves past a stationary magnet will have circular electric currents called eddy currents induced in it by the magnetic field, as described by Faraday's law of induction. In Lenz's law, the circulating currents will create their own magnetic field which opposes the field of the magnet. Thus, the moving conductor will experience a drag force from the magnet that opposes its motion, proportional to its velocity. The electrical energy of the eddy currents is dissipated as heat due to the electrical resistance of the conductor.

In an eddy current brake, the magnetic field may be created by permanent magnet or an electromagnet so that the braking force can be turned on and off or varied by varying the electrical current in the electromagnet's windings. An advantage of such a brake is that the brake does not work by friction. There are no brake surfaces to wear out, necessitating replacement, as with friction brakes. Typically, eddy current brakes are used to slow high-speed trains and roller coasters, to stop powered tools quickly when the power is turned off, and in the electric meters used by electric utilities.

By modern standards, the functionality of a planetary gear set is influenced by which component is held motionless, used as the drive component, and used as the driven or output component. An example of this is how an automatic transmission in an automobile is capable of changing gear ratios by applying a clutch in order to cause a component to become motionless while allowing a different part to serve as either the drive or driven component.

There are several drawbacks to this conventional design. First, it drastically increases the number of components required to have a transmission with multiple speeds. With this high number of parts, there is a tremendous potential for component failure. Second, utilizing clutches and other devices that promote friction will shorten the life of any automatic transmission. This is due to the wear of the friction devices that are used to make a component motionless in a planetary gear set. Thirdly, hydraulic circuitry and related components in an automatic transmission increase the overall cost of the device.

In the past, various patents have issued relating to planetary gear systems. U.S. Pat. No. 3,815,445, issued on Jun. 11, 1974 to Gorrell et al., shows a variable speed planetary transmission which includes a succession of planetary gear trains adapted to provide a relatively uniform stepped or percentage change between the speed ratios in order to provide efficient use of vehicle power and minimize peaks in the vehicle performance curve. One planetary gear train in the variable speed transmission has its carrier coupled to a ring gear of an adjacent planetary gear train on the power input side of the transmission with the sun gear of one of the planetary gear trains being coupled with the carrier of the adjacent planetary gear train.

U.S. Pat. No. 4,697,477, issued on Oct. 6, 1987 the H. B. Barr, shows a continuously variable transmission with constant torque using an epicycle gear mechanism with a casing that rotates freely within an electromagnetic braking device. The braking device utilizes magnetic particles filling a gap between the inner diameter of the braking device and the outer casing of the epicycle gear mechanism such that when the particles are magnetized, they form an adhesive type like resistance to rotation of the epicycle gear annulus.

U.S. Pat. No. 7,059,453, issued on Jun. 13, 2006 to Yamamoto et al., provides an electromagnetic brake interposed between a fixed housing and a rotating member. The electromagnetic brake includes a multiplate brake mechanisms, a ringlike core member fixed through an annular brake guide inside the fixed housing, an exciting coil accommodated in an annular groove formed on the core member, and a ringlike armature member arranged radially outside of the core member.

U.S. Pat. No. 7,300,376, issued on Nov. 27. 2007 to Eckert et al., discloses an electromagnetic selection device for a two-stage planetary gear set. This electromagnetic selection device has an input shaft, an output shaft, a sun gear, a ring gear, a planet carrier with planetary gears, one transmission housing and one sliding sleeve for switching one first gear in which the ring gear can be coupled with the housing and one second gear in which the ring gear can be coupled with the sun gear. The sliding sleeve is movable by way of one electromagnetic consisting of magnet coils and one armature.

U.S. Pat. No. 7,534,188, issued on May 19, 2009 to Pritchard et al., teaches a transfer case input shaft brake system. The transfer case includes a planetary gear assembly and a shift sleeve that is used for selecting either the reduced speed gear ratio in which the torque from the input is transferred through the planetary gears or the direct drive speed ratio in which the input and output shafts are coupled directly together. The carrier of the planetary gear assembly is equipped with a surface that is capable of receiving a band brake that is disposed thereabout. A lever composed of two pieces, a brake apply arm and a cam follower, applies the brake band and in doing so controls the planet carrier, controls the speed of the carrier, and controls the output of the planetary gear assembly.

U.S. Pat. No. 7,540,818, issued on Jun. 2, 2009 to Miller et al., provides a continuously variable planetary gear set having a generally tubular idler, and a plurality of balls distributed radially about the idler in which each ball has a tiltable axis about which it rotates. A rotatable input disc is positioned adjacent to the balls in contact with each of the balls. A rotatable output disc is positioned adjacent to the balls opposite the input disc and in contact with each of the balls such that each of the balls makes three points of contact with the input disc, the output disc, and the idler. A rotatable cage is adapted to maintain the axial and radial position of each of the balls. The axes of the balls are oriented by the axial position of the idler.

U.S. Pat. No. 8,133,143, issued on Mar. 13, 2012 to B. W. Schoon, discloses a compact gear reducer electric motor assembly with an internal brake in which a high-speed electric motor is interconnected with a gear reducer having a substantial gear reduction. The assembly includes a spindle and a brake mounted substantially within the high-speed electric motor and operable against a spring biased so as to put the brake into engagement with ground. The brake is electrically actuated to permit transmission of energy to the gear reducer. The gear reducer includes an input, intermediate and output planetary stages. The input and intermediate stages reside within the spindle and the output planetary stage drives an output ring gear.

U.S. Pat. No. 8,869,952, issued on Oct. 28, 2014 to T. Sano, shows a yoke core of an electromagnetic brake system which includes a rotation shaft hole portion through which a rotation shaft is penetrated and also includes an inner yoke portion and an outer yoke portion which are arranged on both inner and outer sides by pinching a concave groove. A coil is accommodated in the concave groove and a magnetic flux is generated by applying electricity to attract an armature. The armature has a penetrating hole portion in the center and a protruded shaft portion formed on the inner yoke portion is inserted into the penetrating hole portion. The rotation shaft has one side thereof rotatably supported by a support portion of a housing and the other side thereof rotatably supported by the protruded shaft portion via the armature and a planetary gear mechanism.

U.S. Pat. No. 8,961,350, issued on Feb. 24, 2015 to Millet et al., teaches a continuously variable transmission with a chain output. This continuously variable transmission includes an input member, an output member, and a first planetary gear set having first, second and third members. The first member is interconnected with the input member. A brake is connected to the second member of the first planetary gear set. A clutch is interconnected between one of the first member, the second member and the third member of the first planetary gear set and another one of the first member, the second member, and the third member of the first planetary gear set. A belt and pulley assembly is connected to the third member of the first planetary gear set and the output member. A chain drive is interconnected to the output member.

U.S. Patent Application Publication No. 2004/0180747, published on Sep. 16, 2004 to Weiland et al., provides a motor vehicle transfer case that includes an input shaft and an electromagnetic brake for retarding rotation of the input shaft. An electromagnetic coil is mounted to the front of the transfer case about the input shaft. An armature plate is secured to the input shaft adjacent the electromagnetic coil. The energization of the coil retards rotation of the input shaft and cancels neutral drag torque from the transmission thereby eliminating relative rotation between the shipping elements of the transfer case.

U.S. Patent Application Publication No. 2014/0038761, published on Feb. 6, 2014 to H. Xu, discloses a continuously variable transmission that includes an input member, an output member, an input disc rotationally coupled to the input member, an output disc having an output gear, a roller disposed between the input disc and the output disc and configured to transfer torque from the input disc to the output disc, a counter gear inter-meshed with the output gear, and a planetary gear set connected to the output member. The planetary gear set includes a ring gear, a carrier member and a sun gear. The ring gear is rotationally coupled to the counter gear. The counter gear in the planetary gear are coplanar with the output disc.

It is an object of the present invention to provide a output planetary gear set that decreases the number of components required for multiple speeds.

It is another object of the present invention to provide a variable output planetary gear set that reduces the chances of component failure.

It is another object of the present invention to provide a variable output planetary gear set that avoids clutches and torque converters.

It is another object of the present invention to provide a variable output planetary gear set that reduces friction among components.

It is still another object of the present invention to provide a variable output planetary gear set which minimizes hydraulic circuitry and related components.

These and other objects and advantages of the present invention will become apparent from a reading of the attached specification and appended claims.

BRIEF SUMMARY OF THE INVENTION

The present invention is a variable output planetary gear set with electromagnetic braking. In particular, this apparatus comprises an input shaft, an input gear affixed to the input shaft so as to rotate with a rotation of the input shaft, a brake rotor, a rotor input gear affixed to the brake rotor, a planetary gear set cooperative with the input gear, an output shaft cooperative with the planetary gear set, and an electromagnetic brake cooperative with the brake rotor so as to selectively apply a braking force so as to slow the rotation of said rotor input gear. The planetary gear set includes a planetary input gear engaged with the input gear, a planetary carrier connected to the planetary input gear so as to rotate with a rotation of the planetary input gear, a plurality of planetary gears supported by the planetary carrier, a sun gear engaged with the plurality of planetary gears, and a ring gear engaged of the plurality of planetary gears and engaged with the rotor input gear.

In the present invention, the sun gear is connected to the output shaft. The planetary input gear is connected to the planetary carrier such that the planetary carrier rotates relative to a rotation of the planetary input gear. The planetary carrier is connected to the plurality of planetary gears. The plurality of planetary gears are engaged with an interior of the ring gear.

In the present invention, the electromagnetic brake comprises an eddy current brake. The brake rotor is received in an interior of the electromagnetic brake. The brake rotor is formed of a conductive material. The eddy current brake applies a magnetic field to the brake rotor.

In connection with the present invention, in one embodiment, there can be a propeller affixed to the input shaft. A generator can be connected or interconnected to the output shaft such that the rotation of the output shaft causes the generator to produce electricity. A control unit is electrically connected to the electromagnetic brake so as to control the braking force on the brake rotor. The control unit has inputs sensing a rotational speed of the input shaft, a rotational speed of the output shaft, and a rotational speed of the brake rotor. The control unit applies the braking force based upon these inputs.

The input gear has a greater number of teeth than a number of teeth of they planetary input gear. The rotor input gear has a lesser number of teeth than a number of teeth of the ring gear. In particular, the ring gear has an external teeth and internal teeth. The rotor input gear is engaged with the external teeth of the ring gear. The plurality of planetary gears are engaged with the internal teeth of the ring gear.

This foregoing Section is intended to describe, with particularity, the preferred embodiments of the present invention. It is understood that modifications to these preferred embodiments can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
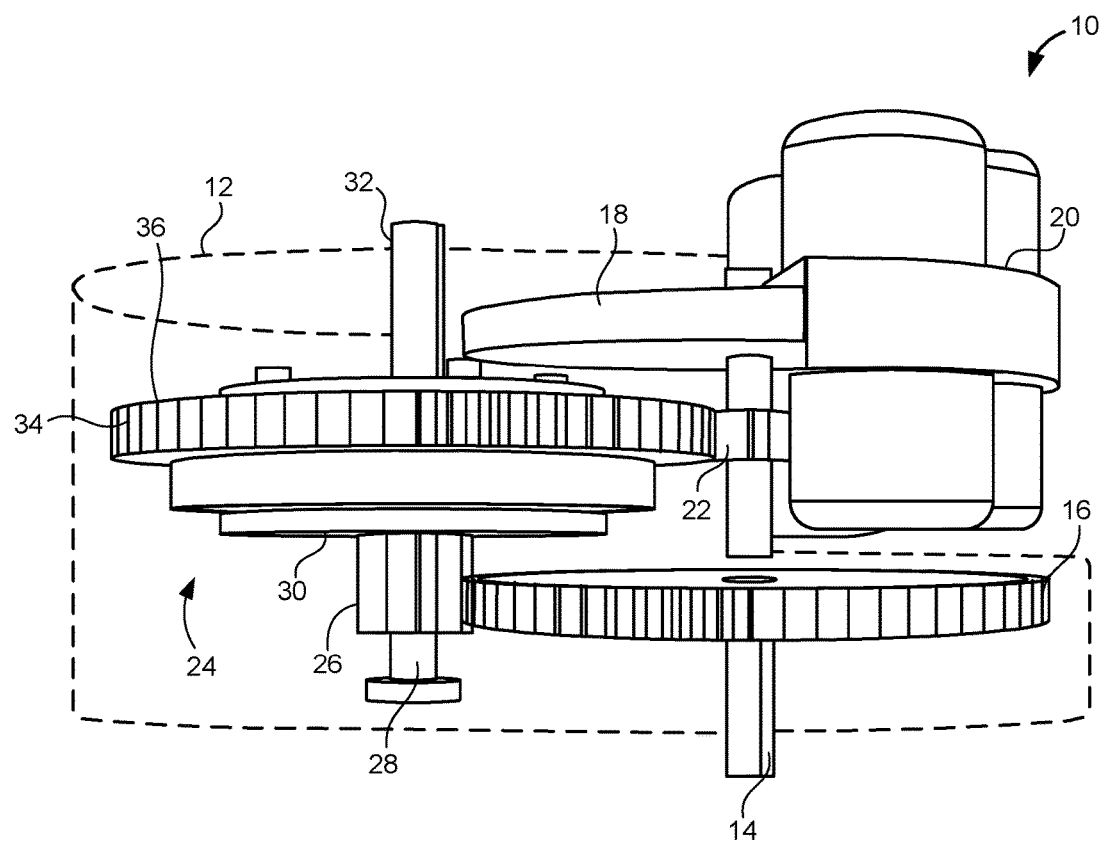
FIG. 1 is a plan view showing the variable output planetary gear set in accordance with the preferred embodiment the present invention.

Referring to FIG. 1, there is shown the variable output planetary gear set 10 in accordance with teachings of the present invention. The variable output planetary gear set 10 includes an input shaft as positioned within a housing 12. An input shaft 14 extends outwardly of the housing 12 so as to be connected to a source of rotational input. An input gear 16 is affixed to the input shaft 14 so as to rotate with a rotation of the input shaft 14. A brake rotor 18 is received by an electromechanical brake 20. A rotor input gear 22 is connected to the brake rotor 18. The brake rotor 18 is not mechanically connected to the input shaft 14.

A planetary gear set 24 is cooperative with the input gear 16. In particular, the planetary gear set 24 includes a planetary input gear 26 that is mounted on a shaft 28 and which is engaged with the input gear 16. The planetary carrier 30 is connected to the planetary input gear 26 so as to rotate with a rotation of the planetary input gear 26. As such, as the input gear 16 causes the planetary input gear 26, to rotate the planetary carrier will rotate in correspondence therewith. It can be seen that the input gear 16 has a greater number of teeth than the planetary input gear 26. As will be described hereinafter, the plurality of planetary gears are supported by the planetary carrier 30. A sun gear will be positioned on the interior of the plurality of planetary gears and connected to the output shaft 32. A ring gear 34 will be meshed with the plurality of planetary gears on internal teeth thereof (as will be shown hereinafter). The ring gear 34 also has an external teeth 36 that are engaged with the teeth of the rotor input gear 22. The external teeth 36 of the ring gear 34 are greater in number than the number of teeth of the rotor input gear 22. It can be seen that the output shaft 32 extends outwardly of the housing 12.

In FIG. 1, the brake rotor 18 is at least partially received within the interior of the electromagnetic brake. In the present invention, the electromagnetic brake 20 is an eddy current brake. The brake rotor 18 is formed of a conductive material. The eddy current brake 20 applies a magnetic field to the brake rotor so as to selectively slow a rotation of the brake rotor 18 and, in correspondence therewith, the rotation of the rotor input gear 22.

Figure 2:
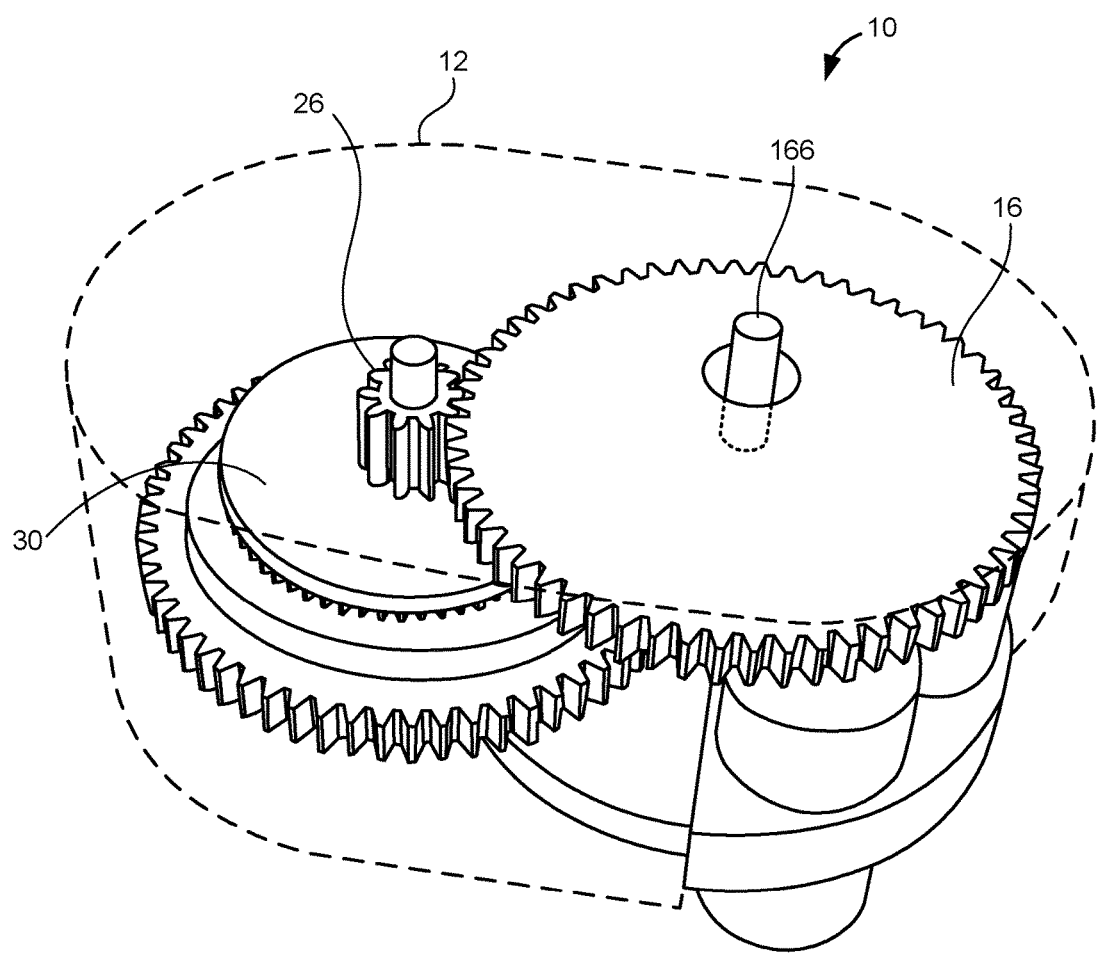
FIG. 2 is a perspective view of the variable output planetary gear set in accordance with the present invention.

FIG. 2 shows the variable output planetary gear set 10 of the present invention in a perspective view internal of the housing 12. In particular, the input shaft 14 is illustrated as fixed to the input gear 16. As the input shaft 14 rotates, the input gear 16 will rotate and apply torque to the planetary input gear 26. This gear is fixed to the planetary carrier 30 and will rotate at a speed that is multiplied by the gear ratio between the input gear 16 and the planetary input gear 26. One example that would be useful in the present invention would have a gear ratio of 1:36. In other words, for each revolution of the input gear 16, thirty-six revolutions of the planetary input gear 26 will be produced. The gear ratio between the input gear 16 and the planetary input gear 26 is a design attribute that would be optimized to suit the end applications.

As can be seen in FIGS. 1 and 2, the ring gear 34 of the planetary gear set 24 is mated with the rotor input gear 22. The rotor input gear is fixed to the brake rotor 18. During operation, as torque is applied to the planetary carrier 30, the planetary gears will begin to rotate. While rotating, torque will be divided between the ring gear 34 and the sun gear (in the interior of the ring gear 34). This makes for a condition where, if a load is attached to the output shaft 32, all of the torque will be transmitted to the ring gear 34. This will not drive the load unless a brake is applied to limit the rotation of the ring gear 34. As such, the electromagnetic brake 20 is used to slow the rotation of the brake rotor 18 so as to result in torque being transferred to the output shaft 32. As can be seen in FIG. 1, the rotor input gear 22 has a mechanical advantage over the ring gear 34. This is a design attribute that what will result in less power required for the electromagnetic brake 20 to reach a full apply state or a rotor with no revolutions per minute.

Figure 3:
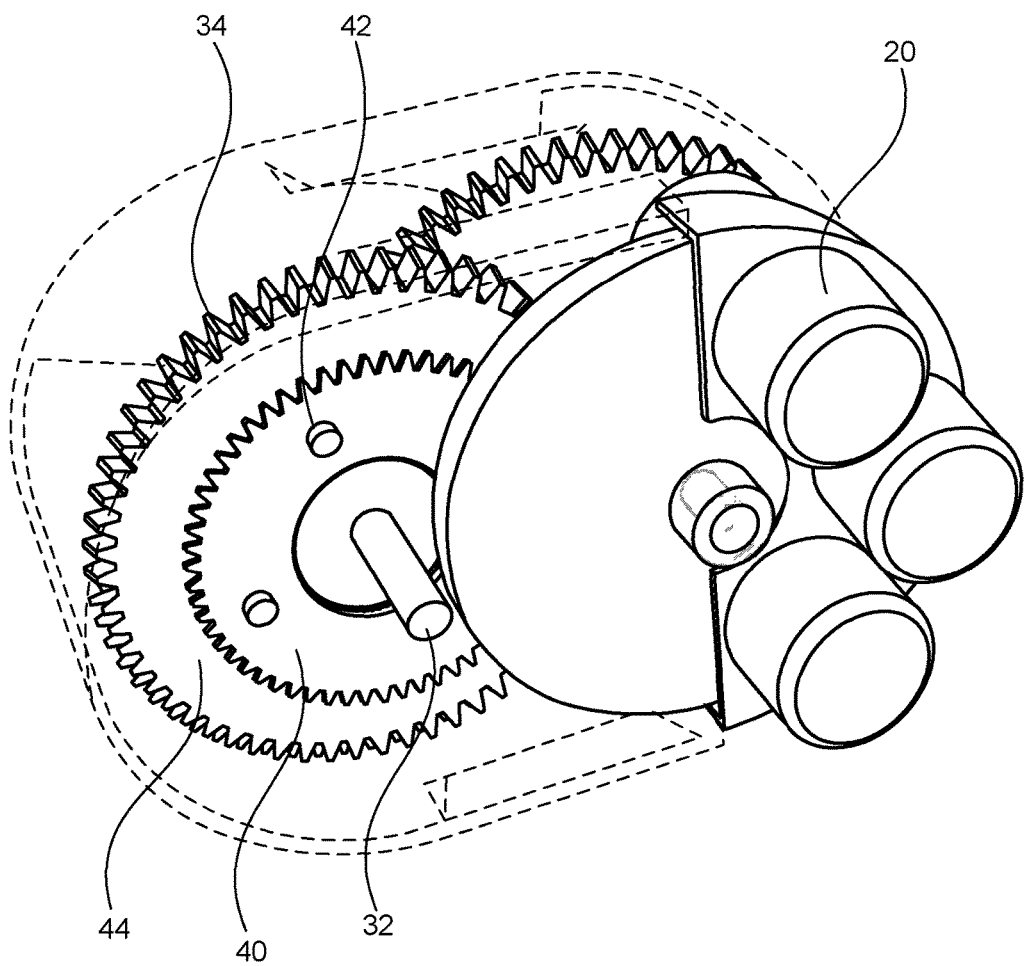
FIG. 3 is a perspective view showing the variable output planetary gear set of the present invention with the planetary carrier removed so as to show the interior of the ring gear.

FIG. 3 shows the interior of the ring gear 34 with the planetary carrier removed therefrom. In FIG. 3, can be seen that the sun gear 40 is affixed to the output shaft 32. The plurality of planetary gears 42 are meshed with the internal teeth 44 of the ring gear 34 and also meshed with the teeth of the sun gear 40. It is typical for the planetary gear design to support the planetary carrier on both sides. Otherwise, the planetary gears 42 would be supported by a cantilever shaft coming from the planetary carrier. In the present invention, the planetary carrier 30 rotates and causes the planetary gears 42 to transmit torque between the sun gear 40 and the ring gear 34. The precisely governed electromagnetic brake 20 as applied to the ring gear will result in achieving a finite speed of the output shaft 32 regardless of the speed of the input shaft 14.

The variable output planetary gear set 10 of the present invention functions completely off of a single planetary gear set without a clutch or a torque converter. This is accomplished by using the eddy current electromagnetic brake 20 that allows for a precisely regulated amount of slippage without the use of clutches. The most basic example of this functionality is how the variable output planetary gear set 10 can be used to transmit torque to the armature of a generator and to maintain a speed that is a function of 60 Hz, regardless of the input speed.

Figure 4:
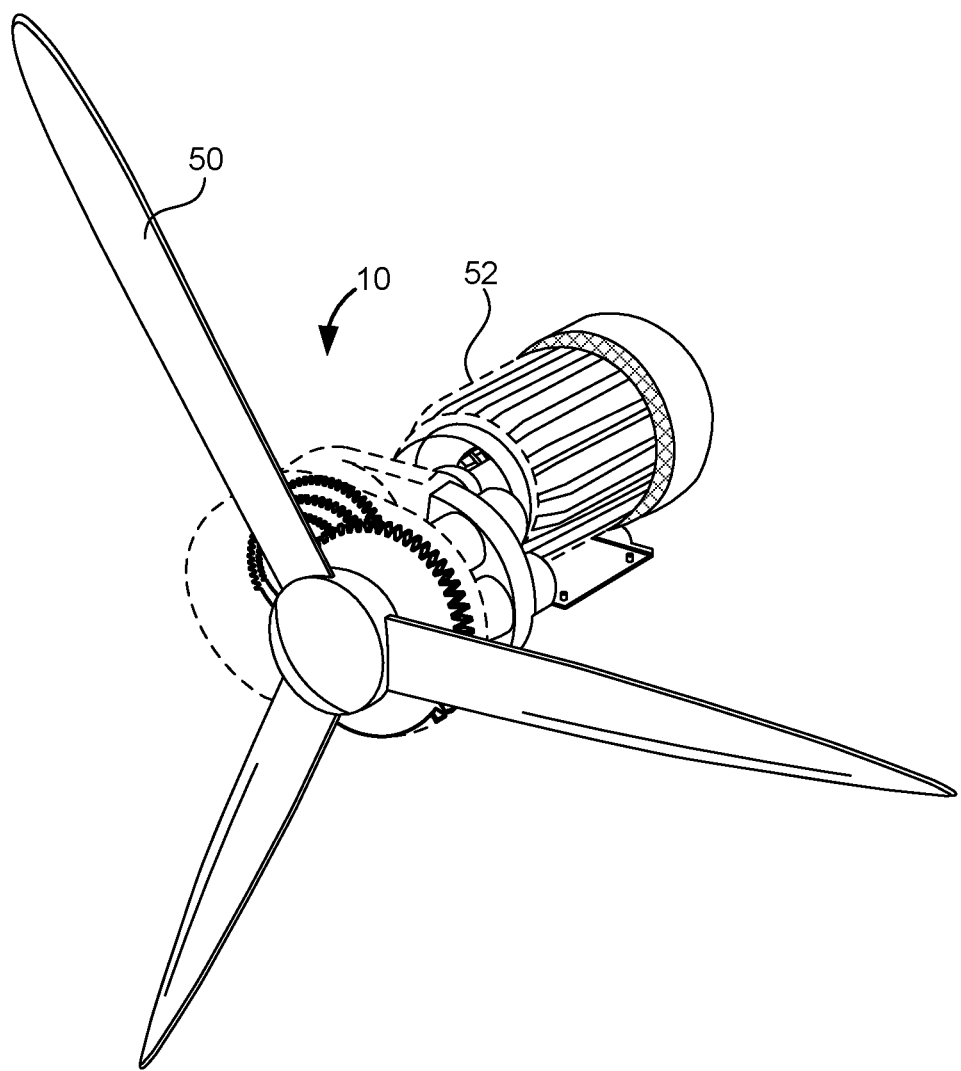
FIG. 4 is a perspective view showing the application of the variable output planetary gear set of the present invention in connection with a wind power generator.

FIG. 4 shows that the there is a propeller 50 that is affixed to the input shaft 14 of the variable output planetary gear set 10 of the present invention. As such, as the propeller 50 rotates as a result of the force of wind, this will cause the input shaft 14 to rotate and cause a corresponding rotation between the various geared connections so as to achieve a rotation of the output shaft 32. The output shaft 32 can then be secured to a generator 52. As such, the rotation of the propeller 50 will cause the generator 52 to produce electricity. The rotor and the brake only slows the rotation of the ring gear, not the input shaft.

In connection with FIG. 4, wind will blow the propeller 50 and turn the input shaft 14 of the variable output planetary gear set 10. The torque then goes through the planetary gear set 24 that multiplies the input speed. Then, the torque drives the rotation of the planetary carrier 30. This is where the rotational speed of the output shaft can be modulated by the electromagnetic brake 20 attached to the ring gear 34. In this application, the sun gear 40 is being used as an output shaft from the variable output planetary gear set 10 to the generator 52. The present invention serves to optimize the gear ratios and minimize the amount of power required to operate the electromagnetic brake 20. The following equation explains the application of the variable output planetary gear set 10 of the present invention in a wind power generator as follows:

$R_I$=RPM of input shaft
$R_O$=RPM of output shaft
$E_D$=Apply state for electromagnetic break (assuming 100% equates to a stationary rotor)
$I_M$=Input speed multiplication
P=Planetary Gear Ratio $$R_O = R_I * I_M * (P * E_D)$$

$$R_O(1800) = R_I(100) * I_M(36) * [P(50) * E_D(0.01)]$$

or $$R_O(1800) = R_I(29) * I_M(36) * [P(50) * E_D(0.0344828)]$$

Figure 5:
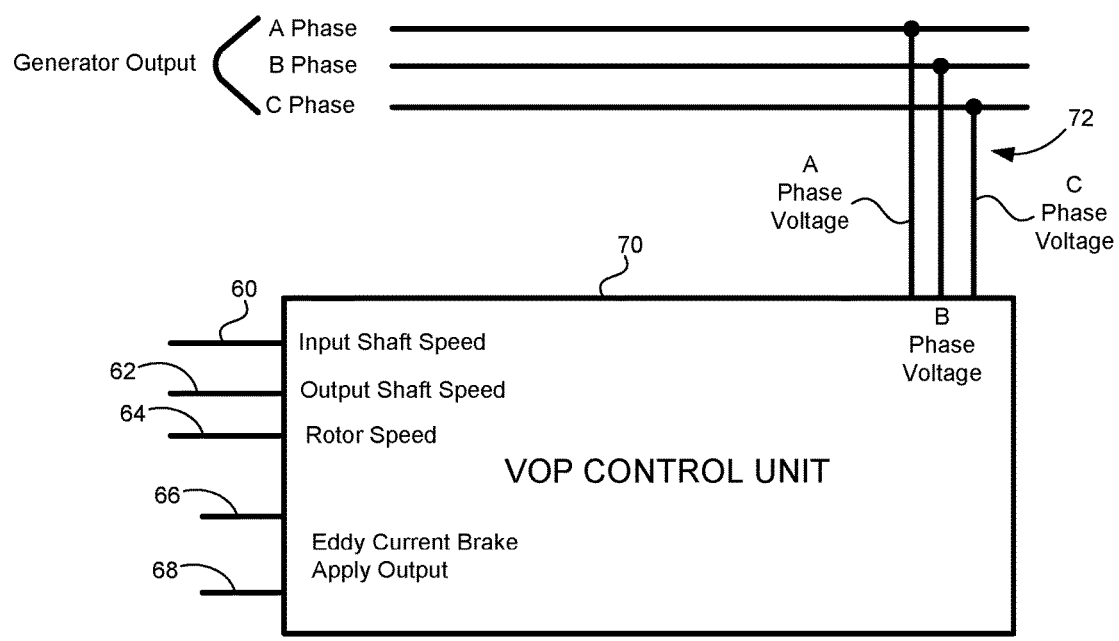
FIG. 5 is a schematic illustration of the control unit associated with the variable output planetary gear set of the present invention.

FIG. 5 shows a control system that can be used in association with the electromagnetic brake 20 and with the variable output planetary gear set 10 of the present invention. In particular, the control unit includes a line 60 that can be connected to an input shaft speed sensor, a line 62 that can be connected to an output shaft speed sensor, and a line 64 that can be connected to a rotor speed sensor. Lines 66 and 68 can extend from control unit 70 so as to activate and apply energy to the eddy current brake 20. The output of the generator 52 can be delivered from the control unit 70 along lines 72 as a generator output.

The control unit 70 governs the operation of the variable output planetary gear set 10. The electronic control unit 70 is required to apply the eddy current brake 20. The electronic control unit 70 will monitor the input shaft speed, the output shaft speed, and the speed of the brake rotor 18 in the eddy current brake 20. These inputs are monitored as the control unit 70 modifies the brake output so that the A, B, and C phases reach the desired speed. In the example of the wind turbine in FIG. 4, it is likely that the desired output speed will be a function of 60 Hz.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
an input shaft;
an input gear affixed to said input shaft so as to rotate with a rotation of said input shaft;
a brake rotor;
a rotor input gear affixed to said brake rotor;
a planetary gear set having a planetary input gear, a planetary carrier, a plurality of planetary gears, a sun gear, and a ring gear, said input gear engaged with said planetary input gear, said ring gear engaged with said rotor input gear;
an output shaft cooperative with said planetary gear set; and
an electromechanical brake cooperative with said brake rotor so as to selectively apply a braking force so as to slow a rotation of said rotor input gear.

2. The apparatus of claim 1, said planetary input gear connected to said planetary carrier such that said planetary carrier rotates relative of a rotation of said planetary input gear.

3. The apparatus of claim 2, said planetary carrier connected to said plurality of planetary gears, said plurality of planetary gears engaged with an interior of said ring gear.

4. The apparatus claim 1, wherein said sun gear is connected to said output shaft.

5. The apparatus of claim 1, said electromechanical brake comprising an eddy current brake.

6. The apparatus of claim 5, said brake rotor received in an interior of said electromechanical brake, said brake rotor formed of a conductive material, said eddy current brake applying a magnetic field to said brake rotor.

7. The apparatus of claim 1, further comprising:
a propeller affixed to said input shaft.

8. The apparatus of claim 7, further comprising:
a generator connected or interconnected to said output shaft such that a rotation of said output shaft causes said generator to produce electricity.

9. The apparatus of claim 1, further comprising:
a control unit electrically connected to said electromechanical brake so as to control the braking force on said brake rotor.

10. The apparatus of claim 9, said control unit having inputs for sensing a rotational speed of said input shaft, a rotational speed of said output shaft, and a rotational speed of said brake rotor, said control unit applying the braking based upon the inputs.

11. An apparatus comprising:
an input shaft;
an input gear affixed to said input shaft so as to rotate with a rotation of said input shaft;
a brake rotor;
a rotor input gear affixed to said brake rotor;
a planetary gear set cooperative with said input gear, said planetary gear set comprising:
  a planetary input gear engaged with said input gear;
  a planetary carrier connected to said planetary input gear so as to rotate with a rotation of said planetary input gear;
  a plurality of planetary gears supported by said planetary carrier;
  a sun gear engaged with said plurality of planetary gears; and
  a ring gear engaged with said plurality of planetary gears, said rotor input gear engaged with said ring gear; and
an output shaft connected to said sun gear and extending therefrom; and
an electromechanical brake cooperative with said brake rotor so as to selectively apply a braking force so as to slow a rotation of said rotor input gear.

12. The apparatus of claim 11, said electromechanical brake comprising an eddy current brake.

13. The apparatus of claim 12, said brake rotor received in an interior of said electromechanical brake, said brake rotor formed of a conductive material, said eddy current brake applying a magnetic field to said brake rotor.

14. The apparatus of claim 11, further comprising:
a propeller affixed to said input shaft.

15. The apparatus of claim 14, further comprising:
a generator connected or interconnected to said output shaft such that a rotation of said output shaft causes said generator to produce electricity.

16. The apparatus of claim 11, further comprising:
a control unit electrically connected to said electromechanical brake so as to control the braking force on said brake rotor.

17. The apparatus of claim 16, said control unit having inputs that sense a rotational speed of said input shaft, a rotational speed of said output shaft, and a rotational speed of said brake rotor, said control unit applying the braking force based on upon the inputs.

18. The apparatus of claim 11, said input gear having a greater number of teeth than a number of teeth of said planetary input gear, said rotor input gear having a lesser number of teeth than the number of teeth of said ring gear.

19. The apparatus of claim 11, said ring gear having an external teeth an internal teeth, said rotor input gear engaged with said external teeth of said ring gear, said plurality of planetary gears engaged with said internal teeth of said ring gear.

* * * * *